UNITED STATES PATENT OFFICE.

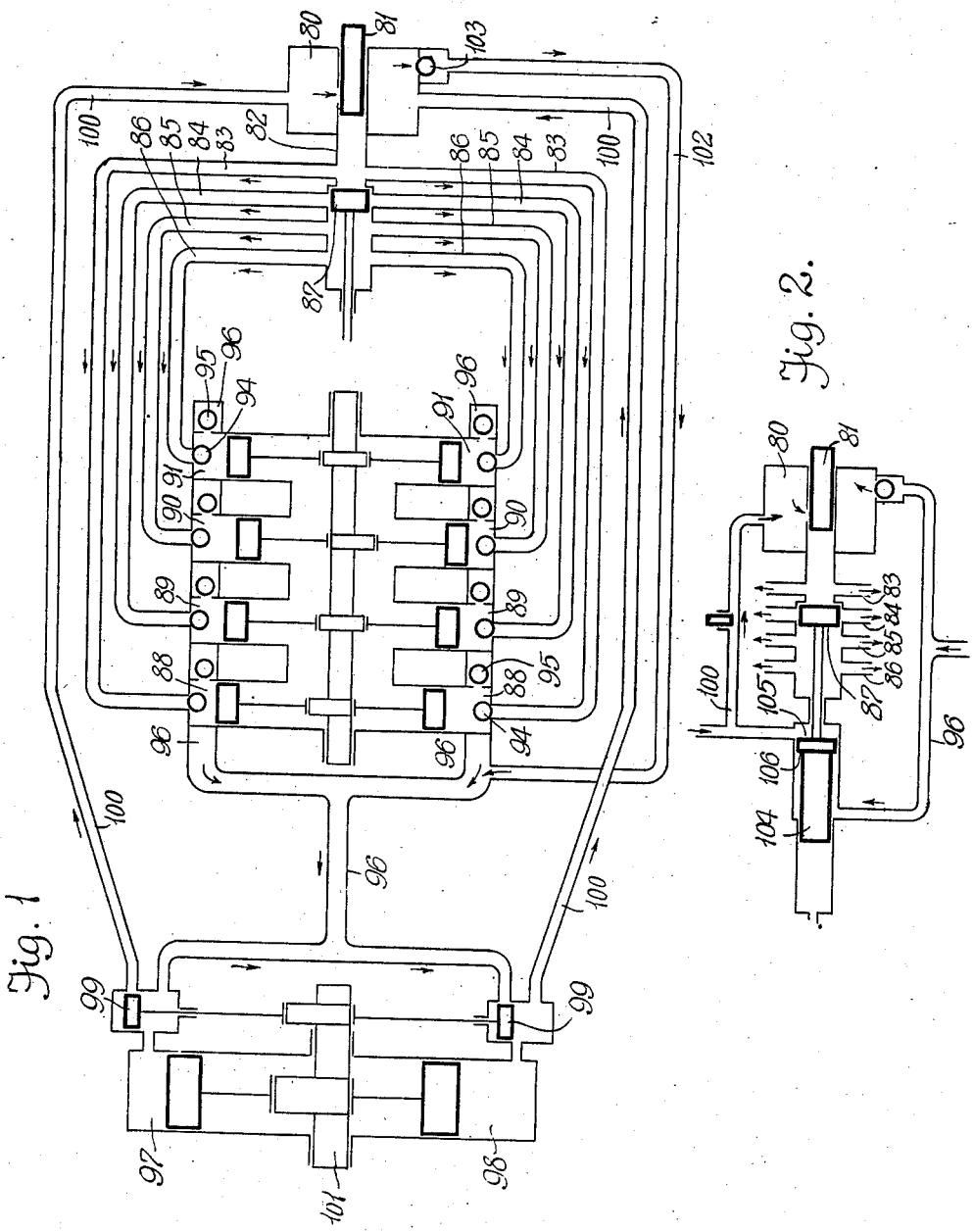

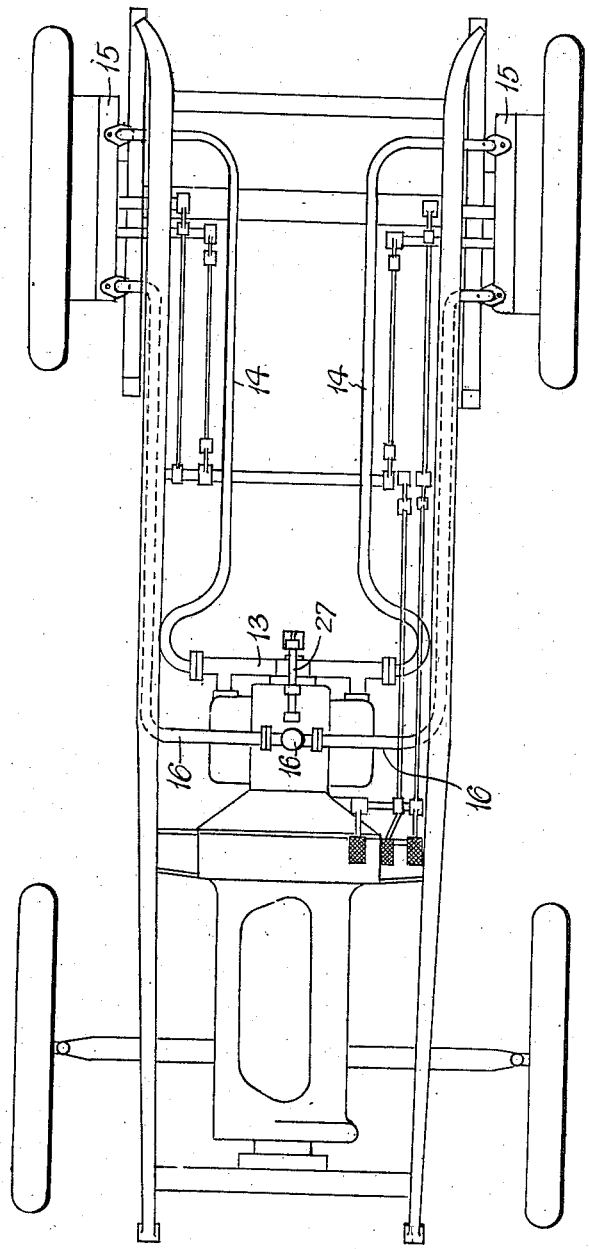

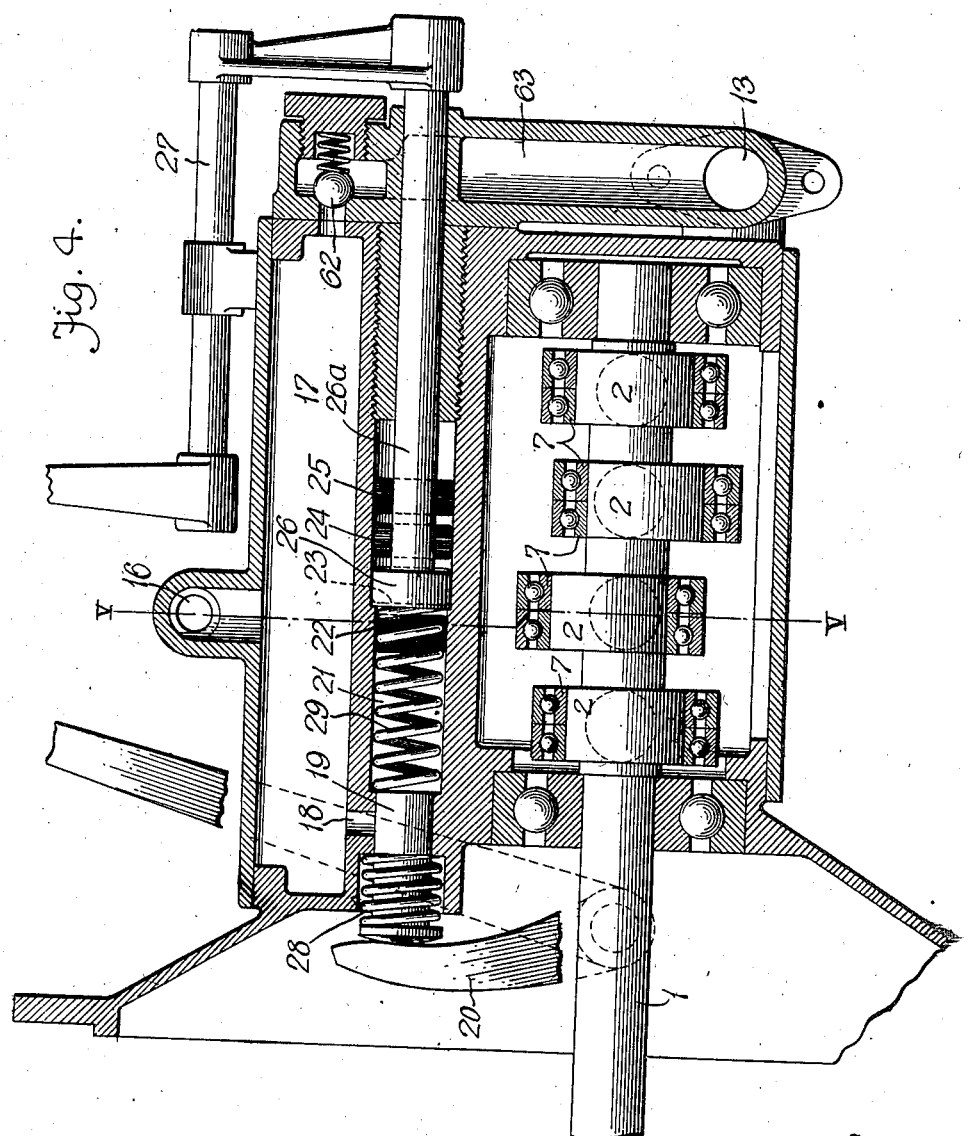

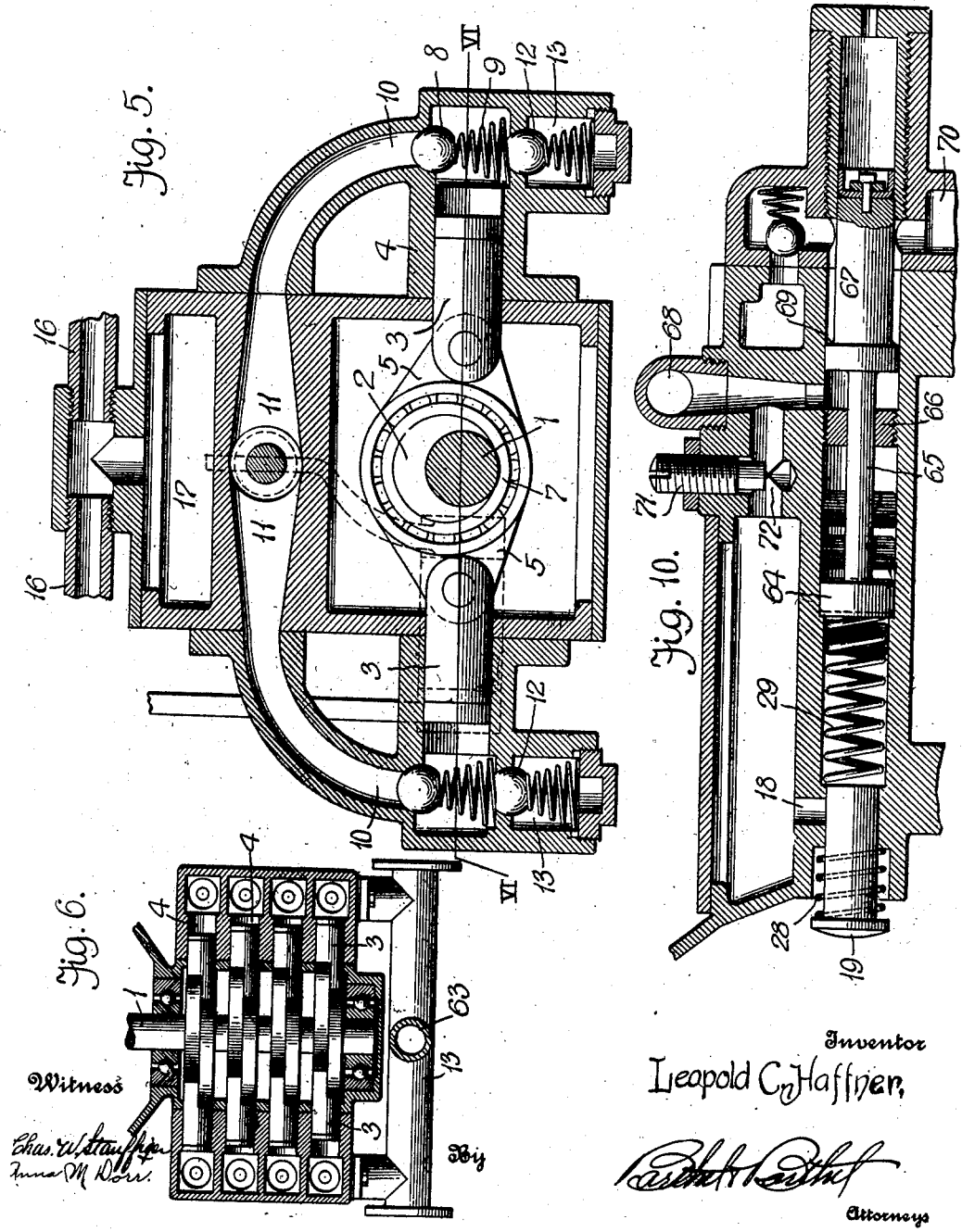

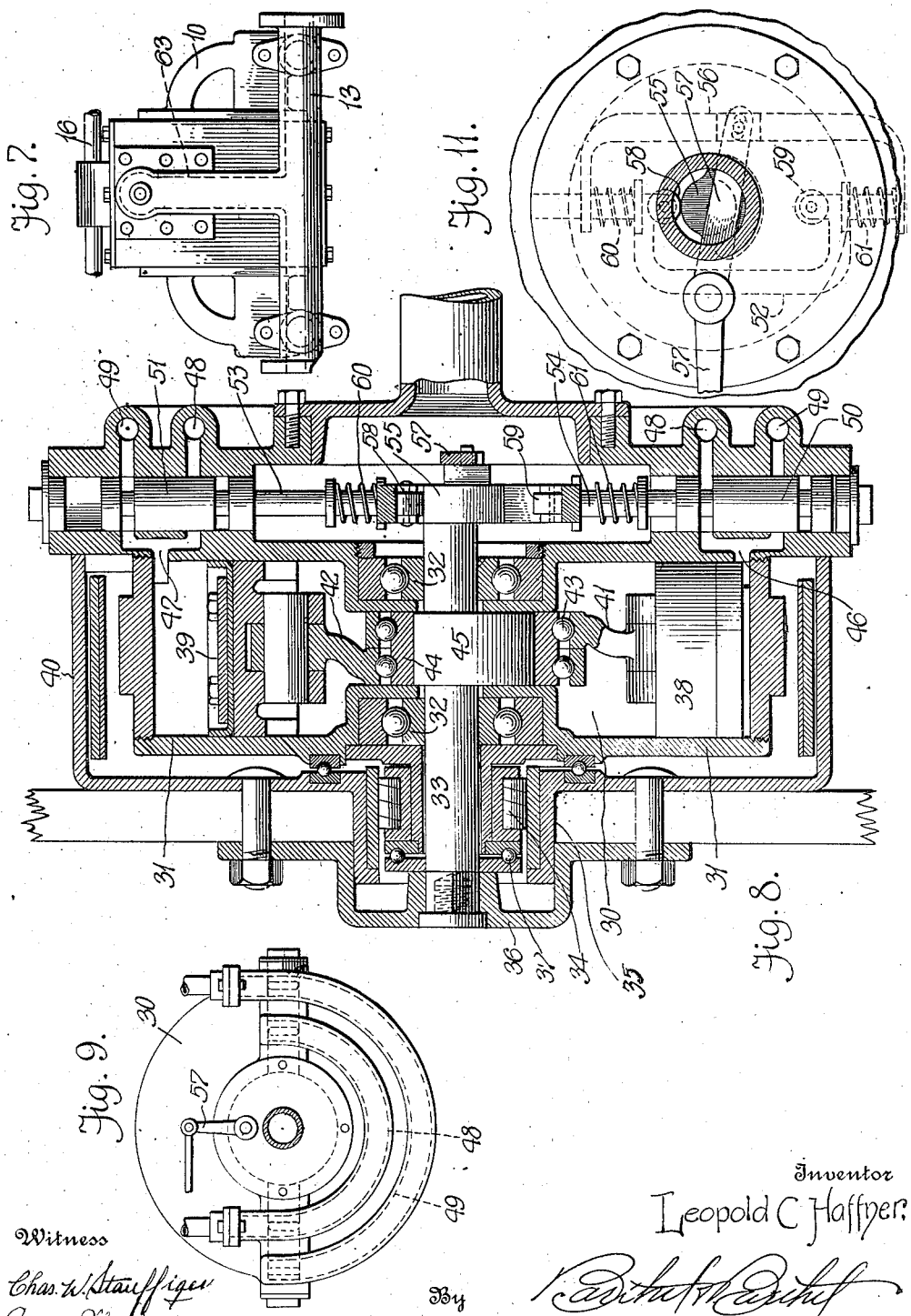

LEOPOLD C. HAFFNER, OF DETROIT, MICHIGAN, ASSIGNOR OF ONE-HALF TO HENRI DE BOISCHEVALIER, OF DETROIT, MICHIGAN.

HYDRAULIC TRANSMISSION.

1,318,143.    Specification of Letters Patent.    Patented Oct. 7, 1919.

Application filed July 7, 1916. Serial No. 107,900.

*To all whom it may concern:*

Be it known that I, LEOPOLD C. HAFFNER, a citizen of the United States of America, residing at Detroit, in the county of Wayne and State of Michigan, have invented certain new and useful Improvements in Hydraulic Transmissions, of which the following is a specification, reference being had therein to the accompanying drawings.

This invention relates to transmission mechanism, wherein power is transmitted by a substantially non-compressible fluid from suitable forcing means, such as a pump, to motors connected to the power-receiving or driven member or mechanism.

The invention includes features whereby the speed ratio between the driving and driven elements may be readily varied to meet different requirements of service and to certain disposition of parts whereby reversal of direction is obtained easily.

The invention consists in the matters hereinafter set forth, and more particularly pointed out in the appended claims.

In the drawings,

Figure 1 is a plan view in diagram of a mechanism embodying features of the invention;

Fig. 2 is a diagrammatic view of automatic means for controlling the speed ratio between the pump and motor;

Fig. 3 is a diagrammatic plan view of an automobile chassis equipped with a transmission mechanism that embodies features of the invention;

Fig. 4 is a view in longitudinal section of a driving pump;

Fig. 5 is a view in transverse section taken on or about line V—V of Fig. 4;

Fig. 6 is a view in detail and in section taken on or about line VI—VI of Fig. 5, and reduced in size;

Fig. 7 is a view in rear elevation of the pump;

Fig. 8 is a view in longitudinal section of a traction bearing wheel and the operating motor;

Fig. 9 is a view in side elevation of the wheel and motor;

Fig. 10 is a view in detail, enlarged and in section, of an automatic means for controlling the speed ratio between the pump and motors in accordance with the load, and Fig. 11 is a view in detail of a valve cam and yoke.

Referring to the drawing and more particularly to the diagrammatic views Figs. 1 and 2, a source of liquid supply 80 is in communication through a valve 81 and a passage 82 and with the intake passages 83, 84, 85, 86 controlled by a valve 87 and with the corresponding cylinders 88, 89, 90 and 91 of a pump driven by a suitable source of power, there being coöperating pistons to the cylinders, intake valves 94 and outlet valves 95. As herein shown, the pump is of the opposed cylinder type but this is optional. A common outlet passage 96 directs the discharge from the valves 95 to the power cylinders 97 and 98 of a fluid-operated motor, there being suitable valve motion indicated diagrammatically at 99 to control the inlet and likewise the discharge, which passes through return pipes 100 to the source of supply 80. Thus any power that is imposed upon the pump is translated and transferred to the shaft 101 of the motor. If for any reason the motor is running idly without receiving power from the pump, a by passage 102 with inwardly closing check valve 103, provides for the consequent circulation.

The valve 87 may thus open more than one pair of cylinders of the pump to the supply of liquid, and in such instance, the speed of the motor is increased while the torque per revolution is decreased, while as the cylinders of the pump are cut off from their source of supply, the speed of the motor decreases and under the well known law of hydraulic transmission of power, there is a consequent increase of torque on the driven member 101 of the motor. As herein indicated one set of the passages 83 may not be under the control of the valve 87, a matter of preference for certain uses.

Referring particularly to the automatic control shown diagrammatically in Fig. 2 the valve 87 is shifted by a differential piston 104, the larger face 105 of which is affected by the pressure in the pipe 100 of the exhaust system against the effect of the pressure in the pipe 96 or pressure side of the system against the smaller annular face 106 of the piston. Thus under increase of load, and consequent increase in back pressure on the motor, the piston 104 tends to close off cylinders of the pump until the transmitted torque through the smaller cylinder area, after the manner of an hydraulic press, is effective to overcome the motor load.

Referring now to a specific adaptation of the system and more particularly to the arrangement thereof for an automobile, as seen in the remaining figures, a main shaft 1 arranged to be operatively connected to a suitable prime mover, operates eccentrics 2, and pairs of opposed pistons 3 reciprocable in companion cylinders 4, the pistons of each pair having a common eccentric to which they are connected by yoke 5 which as herein shown may operate on a ball bearing 6, the inner raceway 7 of which is secured to the eccentric 2. Each cylinder is supplied through an inwardly opening check valve 8 seated by a spring 9 to seal an intake duct 10 leading from a common supply passage 11. Outwardly opening valves 12 each disposed in the cylinder heads, permit the ejectment of the cylinder contents into outlet passages 13 whereby the contents of the pump is forced through suitable conduits 14 to the motor casings 15 on the rear traction bearing wheels. A return pipe 16 from each motor casing discharges into an intake chamber 17 formed in the upper portion of the pump casing. An outlet 18 from the chamber or distributing space 17 is controlled by a plug 19 and suitable member 20 operated by a hand lever or other suitable means to admit water into a valve chamber 21 from which it passes through ports 22, 23, 24 and 25 or one or more of them in accordance with the position of a slide valve 26 of piston type that is itself controlled or operated by a stem 26ª and connecting guide and hand rod 27, the valve being moved longitudinally of the chamber toward or from the port 22 to cut out one or more of the other ports.

A spring 28 or like means is used to hold the plug 19 against the controlling member 20 and similarly a spring 29 coöperates with the guide member 27 to shift the valve 26.

While herein shown as mounted on the chassis, the pump may be placed directly on the rear axle, with appropriate connection from the explosive engine, electric motor or like prime mover used to drive the water pump.

Referring more particularly to the wheel motor, a stationary motor casing 30 carries a pair of oppositely disposed motor cylinders 31 between which suitable bearings 32 afford support to a motor shaft 33. A wheel bearing 34 of any preferred type is likewise mounted on the casing and carries the hub 35 of a wheel of standard type, there being a retaining cap 36 engaging a squared, keyed or splined portion of the shaft to drive the wheel and side thrust bearings 37 to maintain the wheel in position.

Pistons 38 and 39 in the cylinders 31, the latter being housed by the brake drum 40 of the wheel, operate by suitable piston stems 41 and 42 each having a yoke that forms a raceway for bearing balls 43 mounted on an eccentric ring 44 and eccentric disk 45 of the shaft 33. A port 46 in the lower one of the cylinders and a corresponding port 47 in the upper cylinder are each thrown alternately into communication with an inlet duct 48 formed on the casing and with an exhaust passage 49 thereon by means of valves 50 and 51, the annular grooves of which are moved in timed relation to the pistons for register with the port passages as indicated.

Preferably, a cam yoke 52 rigidly connects the stems 53 and 54 of the valves and bridges a cam 55 on the shaft 33. A shifting yoke 56 manipulated by a suitable lever 57, reciprocates on the stems 53 and 54 to bring either an anti-friction roller 58 of the yoke 52 into contact with the cam 55 or another roller 59 of the same yoke into contact therewith, springs 60 and 61 in compression between the yoke arms around the stems, enabling the cam to throw either roll as desired to obtain forward or reverse movement of the motor.

If the motors are running idly through complete shut off of the pump, they maintain circulation through a check valve 62 which controls a by-pass 63 connecting the supply chamber or space 17 with the pipe 13.

As a result of this construction a transmission mechanism is obtained whereby the revolutions of the motor are transmitted through the power pump to the wheel motor and thereby enabled to drive the latter at a speed dependent upon the number of pump cylinders in action, or the ratio of the piston area of the pump to the piston area of the motor. That is, if all pump cylinders are in operation, the wheels are running at maximum speed while if one, two or three pairs are cut off by the appropriate manipulation of the controlling valve, the speed of the motor and wheels in relation to that of the pump is lowered and the power or torque delivered to the wheels accordingly increased so that it is possible to obtain any desired driving torque on the wheels within the range of operation of the mechanism.

By the modification shown in Fig. 10 an automatic speed changing control is obtained whereby the wheel speed in relation to the pump speed is lowered automatically as the load increases. In this arrangement, a main valve or plunger 64 controls the cylinder ports as does the plunger 26.

A stem 65 carried by the closure 64 passes through a suitable packing wall or guide opening therein indicated at 66, and is rigidly secured to the head 67 of a differential plug or plunger, the major area of which is under the pressure of water from the return pipe 68 through appropriate conduits. The lesser face of the differential plunger, which is formed by the annular shoulder 69 thereon, is under control of liquid from the pressure pipe through a suitable conduit 70. A regulatable conduit closure 71 permits adjustment of the pressure of the waste water against the head of the valve 67, as it controls a by passage 72 leading to the main pump chamber which corresponds to the space 17 of the unmodified form, from the return pipe 68.

In case a condition arises under which the pump cannot overcome the resistance offered by the wheels, the pressure in the pressure pipe increases and the pressure in the exhaust pipes lowers as the rotation of the wheel is retarded. Both forces are opposed and a movement of the plunger results which tends to shut off the supply to as many pump cylinders as are necessary, and thereby lower the speed of the wheels in relation to the pump so as to obtain the necessary power to turn the wheels. The spring 29 coöperates with the low pressure in always tending to keep at least one cylinder of the pump open.

As a result of this construction automatic control is obtained whereby at a given pump speed the vehicle speed or driving wheel speed lowers until the necessary power is obtained to move the load. Of course if this is compensated for by manipulation of the explosive engine or other prime mover driving the pump to increase the speed of the engine accordingly, the desired power and speed may be transmitted as service requires within the capacity of the device.

It is to be understood that the parts are designed and arranged to combine strength with lightness, that necessary packing, lubrication and fittings concomitant with good shop practice are employed and that the parts are arranged so as to be controlled readily and inspected easily for repair and displacement.

Obviously, changes in the details of construction may be made without departing from the spirit of my invention and I do not care to limit myself to any particular form or arrangement of parts.

What I claim is:—

1. Transmission mechanism comprising a pump having a plurality of cylinders, coöperating pistons operated by a common crank shaft, a motor operatively connected to the pump to be driven by the discharge thereof and automatically operating means for selectively bringing a desired number of the pump cylinders into operation.

2. Transmission mechanism comprising a pump having a plurality of cylinders with coöperating pistons operated by a common crank shaft, automatically operating means directing fluid to the pistons and cylinders selectively, and a motor connected to the discharge of the pump and driven by the fluid forced therefrom.

3. Transmission mechanism including a pump, cylinders and pistons therein operated by a common crank shaft, a source of fluid supply, means operated by fluid returning to said supply after being discharged therefrom by the pump for directing the supply to the cylinders of the pump selectively, and a motor operated by the fluid discharged from the pump.

4. Transmission mechanism including a pump having a plurality of cylinders with coöperating pistons adapted to draw fluid from a source of supply and eject the same through a common discharge, a slidable member operated by fluid returning to said supply for controlling the intake to the cylinders by uncovering one or more ports leading thereto selectively and a motor driven by the fluid discharged by the pump.

5. Transmission mechanism comprising a pump having a plurality of cylinders with coöperating pistons driven from a common source of power, means for supplying the cylinders selectively with fluid comprising a chamber common to all of said cylinders and having ports communicating therewith and a member movable in said chamber for selectively opening and closing said ports, said member being moved by fluid returning to said chamber and a reversible motor connected to the discharge of the pump and operated by the fluid ejected therethrough.

6. Transmission mechanism including a pump having a plurality of cylinders with coöperating pistons driven from a common source of power and supplied from a common source, a valve for selectively directing the supply to the cylinders, a motor driven by the fluid ejected from the discharge of the pump and means for controlling the valve automatically to decrease the number of cylinders supplied as the load on the motor approaches the capacity of the pump.

7. Transmission mechanism including a pump having a plurality of cylinders with pistons therefor driven from a common source of power and supplied from a common source, a valve selectively directing the supply to the cylinders, a motor driven by the fluid discharged from the pump, and means for returning the fluid to the source of pump supply, said valve being automatically operated by said returning fluid.

8. Transmission mechanism including a pump having a plurality of cylinders with pistons therefor driven from a common source of power and supplied from a common source, a valve selectively directing the supply to the cylinders, a motor driven by the fluid discharged from the pump, means for returning the fluid to the source of pump supply, and a by-pass forming an idle circulating system for the motor when running idly.

9. Transmission mechanism comprising a fluid circulating system that includes a pump having a plurality of cylinders with coöperating pistons driven from a common source of power and connected to a source of fluid supply in the system, a motor operated by the discharge from the pump, means for directing the liquid from the motor to the source of supply, a by-pass forming an independent circulatory system for the motor when the latter is running idly, and means for varying the supply selectively to the pump cylinders.

10. Transmission mechanism comprising a fluid circulating system that includes a pump having a plurality of cylinders with coöperating pistons driven from a common source of power and connected to a source of fluid supply in the system, a motor operated by the discharge from the pump, means for directing the liquid from the motor to the source of supply, a by-pass forming an independent circulatory system for the motor when the latter is running idly, and means for automatically directing the supply of fluid to the pump cylinders selectively in inverse ratio to the load on the motor.

11. Transmission mechanism comprising a pump having a variable piston area, a motor connected to the discharge of the pump and driven by the fluid forced therefrom, and means operated by fluid returning to the pump for automatically varying the effective area of the pump.

12. In an automobile, the combination of a chassis, power plant and traction bearing wheels thereof, with a pump having a variable piston area, motors each connected to the discharge of the pump and driven by the fluid forced therefrom for operating the traction bearing wheels, and means operated by fluid returning to the pump for automatically varying the effective piston area of the pump, together with driving connection between the power plant and pump.

13. In an automobile, the combination of the power plant and traction bearing wheels thereof, with a pump operated by the power plant and provided with a variable piston area, motors operatively connected to the traction bearing wheels and driven by the discharge of the pump and means operated by fluid returning to the pump for automatically regulating the piston area of the pump.

14. In an automobile, traction bearing wheels, a power plant, motors for driving the traction bearing wheels adapted to be operated by fluid under pressure, a pump operated by the power plant for discharging fluid under pressure to the motors, and means operated by fluid returning to the pump for automatically varying the effective piston area of the pump to increase the torque on the bearing wheels in proportion to the load.

15. In an automobile, traction bearing wheels, a power plant, a pump driven from the power plant and provided with a plurality of cylinders and coöperating pistons, motors connected to the traction bearing wheels to drive the latter and operated by fluid discharged from the pump, and means operated by the fluid after passing the motors for selectively bringing the desired number of pump cylinders into operation.

16. In an automobile, traction bearing wheels, a motor directly connected to each traction bearing wheel adapted to be driven by fluid under pressure, a pump having a variable piston area, means for driving the pump, means for directing the discharge from the pump into the motors, and automatically operating means for selectively bringing a desired amount of the pump piston area into operation in accordance with the torque necessary to operate the traction wheels.

17. In an automobile, a prime mover, a pump operated thereby having a variable piston area, traction bearing wheels, a motor for each wheel adapted to be driven by fluid discharged from the pump, means for directing the discharge from the motors to the source of supply of the pump, and means automatically operated by fluid returning to the source of supply for selectively varying the effective piston area of the pump in accordance with the work to be delivered by the motors.

18. In an automobile, a prime mover, a pump operated thereby having a variable piston area, traction bearing wheels, a motor for each wheel adapted to be driven by fluid discharged from the pump, means for directing the discharge from the motors to the source of supply of the pump, means for selectively varying the effective piston area of the pump in accordance with the work to be delivered by the motor, and a by-pass for forming a local circulatory system for the motors when they are not driven by the pump.

19. In an automobile, a traction bearing wheel, a motor casing adjacent which the wheel is journaled, a motor shaft secured to the wheel to drive the latter, cylinders and pistons coöperating to turn the shaft, valve gears for distributing operating fluid under pressure to the pistons and cylinders, a prime mover, a pump having a variable piston area and delivering fluid to the pump casing, and means automatically operated by the fluid after passing the motor for selectively varying the effective area of the pump.

20. In an automobile, a pair of traction bearing wheels, a motor casing mounted adjacent each wheel and provided with cylinders, coöperating pistons and motor shaft driven by the pistons, the shaft of each motor turning a companion wheel, a source of fluid supply, a prime mover, a pump having a plurality of cylinders connected to the source of supply, a discharge connected to the wheel motors, means for directing fluid from the wheel motors to the source of supply, and automatically operating means for selectively admitting fluid to the pump cylinders.

21. In an automobile, a pair of motors each consisting of motor cylinders with coöperating pistons and a motor shaft driven thereby mounted adjacent a traction bearing wheel of the automobile, with the shaft thereof operatively connected to said wheel, a prime mover, a pump driven thereby and provided with a plurality of cylinders, a source of fluid supply for the cylinders, automatically operating means for selectively admitting fluid to the pump cylinders, a common discharge for the pump delivering to the wheel motors, and means for returning the fluid discharged through the motors to the source of supply.

22. In an automobile, a pair of motors each consisting of motor cylinders with coöperating pistons and a motor shaft driven thereby mounted adjacent a traction bearing wheel of the automobile with the shaft thereof operatively connected to said wheel, a prime mover, a pump driven thereby and provided with a plurality of cylinders, a source of fluid supply for the cylinders, means for selectively admitting fluid to the pump cylinders, a common discharge for the pump delivering to the wheel motors, means for returning the fluid discharged through the motors to the source of supply, and a by-pass for establishing a circulatory system for each motor when not operated by the pump.

23. In an automobile, traction bearing wheels, a fluid operated motor for driving each bearing wheel, a source of fluid supply, a pump for forcing fluid from the supply to the motors, means for returning discharge from the motors to the source of supply, a plurality of cylinders in the pump, a valve for selectively opening the supply to the pump cylinders, a differential piston for operating the valve controlled by the pressures in the outlet and return pipes of the system and adapted to decrease the number of cylinders supplied as the back pressure approaches the outlet pressure in the system, and a prime mover for driving the pump.

In testimony whereof I affix my signature in presence of two witnesses.

LEOPOLD C. HAFFNER.

Witnesses:
  C. R. STICKNEY,
  A. M. DORR.